Patented Nov. 20, 1951

2,575,998

UNITED STATES PATENT OFFICE 2,575,998

OPTICAL ELEMENT OF POLYMERIZED METHACRYLATE RESIN COATED WITH THIN FILM OF THERMOSET RESIN

Dexter P. Cooper, Jr., Cambridge, Mass., assignor to Polaroid Corporation, Cambridge, Mass., a corporation of Delaware No Drawing. Application December 17, 1947, Serial No. 792,342

3 Claims. (Cl. 88—57)

This invention relates to optical elements such as lenses, prisms, corrector plates, and the like, and more particularly to such elements comprising transparent, molded, relatively soft, polymerized organic plastics coated with an exceedingly thin, polymerized, transparent, scratch-resistant film of a thermosetting resin from the class consisting of the melamine-formaldehyde, phenol-formaldehyde, and urea-formaldehyde resins.

An object of the invention is to provide an optical element such as a lens, prism, corrector plate, or the like of a molded or cast polymerized, transparent organic plastic such as an acrylic resin, and more specifically methyl methacrylate or a copolymer thereof coated with a highly adherent, transparent, smooth, scratch-resistant, polymerized film of a thermosetting resin such, for example, as melamine-formaldehyde, the coating being extremely thin, of the order, for example, of one-half micron to one and one-half microns in thickness.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

By this invention there is provided a transparent plastic optical element, one or all surfaces of which are formed by an exceedingly thin layer or film of a hard, transparent thermoset resin, and more specifically melamine-formaldehyde, and the body portion of which comprises a precision cast polymeric methacrylate, and more specifically methyl methacrylate or a copolymer thereof. The hard surface layer may preferably be of the order of one or two wavelengths of light in thickness, i. e., of the order of one-half to one and one-half microns in thickness.

Preferred embodiments of this invention comprise acrylic resin components such, for example, as acrylic resin lenses, prisms, and more specifically corrector plates for use in Schmidt optical systems employed in connection with television receiving apparatus, which have been molded or cast in contact with molding surfaces adapted to impart optically smooth outer surfaces to the said elements. Such plastic elements are presently in high demand, primarily because of the relative cheapness and ease of their manufacture, particularly where the outer surfaces of such elements possess asymmetry of the order of that found, for example, in connection with Schmidt corrector plates. Molded plastic elements of this type have been employed commercially for some time. They have been found highly satisfactory from every standpoint, except from that of scratch resistance. Even where elements of this kind are fairly well protected from dust, the occasional cleaning necessary in servicing the apparatus has invariably given rise to such impairment in the optical smoothness of the surface of the element because of scratching as to require replacement of the element within a relatively short time. This advantage has been of such an order as to result in the widespread use of glass elements even under circumstances where the cost of the molded plastic element has been less than one-half of the competing glass element.

This invention is directed to a solution of the problem of hard surfacing molded plastic elements of the character described, and more specifically such relatively large and complex elements as Schmidt corrector plates. The product of the present invention shows high scratch resistance. The life of the element in service is extended by as much as four or five times the life of the uncoated element heretofore commercially employed, and the cost of processing optical elements in accordance with the present invention is slight and but a small fraction of the total cost of production of the element.

The invention may conveniently be illustrated by the coating of a cast corrector plate comprising polymerized methyl methacrylate with a thermosetting melamine-formaldehyde resin. The melamine-formaldehyde composition employed in the practice of the invention may be an unmodified melamine-formaldehyde, or it may be a melamine-formaldehyde composition containing a small amount, for example about ten per cent, of alkyd resin modifier. In either case, a thin solution of the resin is prepared; for example, a solution consisting of about two parts of the resin, one part of a solvent for the resin such as xylol or other suitable solvent, and twenty parts of a thinner or solvent thinner for the resin such, for example, as butanol. While the proportions given are not critical, they are representative of proportions which have been found highly satisfactory in the practice of the invention. In any event, a very thin solution of the melamine-formaldehyde partial polymer is prepared in the solvent or solvent mixture. The corrector plate, which may comprise, for example, polymerized methyl methacrylate or a copolymer of methyl methacrylate such, for example, as a copolymer of equal parts of methyl methacrylate and cyclohexyl methacrylate, is dipped in the thin solution of the melamine-formaldehyde resin, stood on end and the solution permitted to drain, leaving an exceedingly thin film upon the surfaces of the corrector plate. The coated element is then heated, for example at a temperature of about 80° C. or preferably at the highest temperature at which the lens element does not soften, for a short period, for example about five minutes, to dry out the solvent from the coating, and the element is then placed in an oven where it is subjected to hydrochloric acid fumes or other suitable catalyst for expediting the hardening of the thermosetting resin coating, and is then heated, for example at a temperature of about 80° C. for a period of time, for example twenty minutes, or until the coating is hard and scratch resistant. The times of treatment are not critical; the steps comprise preferably drying the coating after dipping and draining and then setting the coating in the presence of a catalyst and at a temperature such that the shape and optical properties of the methacrylate element are not impaired or altered.

It will be understood that in lieu of melamine-formaldehyde other hard, thermosetting resins may be employed, and specifically a urea-formaldehyde resin or a phenol-formaldehyde resin, in which case the process of preparing the coating on the plastic element which is described above may be followed with modifications as to solvents and temperatures and heating times as are all well known in the art. A melamine-formaldehyde coating is preferred.

The product of the process described comprises an optical element of polymerized methacrylic resin having a hard, scratch-resistant coating of melamine-formaldehyde or other thermosetting resin which adheres vigorously to the methacrylate base. The coating is exceedingly thin. Satisfactory products have been produced in which the coating is of the order of one-half micron or one wavelength of light in thickness, and preferably the coating should be no thinner. Satisfactory products have also been produced in which the coating is of the order of two wavelengths or one and one-half microns in thickness, and coatings of this thickness in no way impair or alter the optical properties of the coated element.

Optical elements which when uncoated show a forty per cent increase in haze when subjected to the standard A. S. T. M. falling carborundum test show, when coated, an increase in haze only of the order of about eight to ten per cent, and this improved hardness and scratch resistance greatly increase the useful life of the coated element in service.

While the invention has been described in connection with the production of Schmidt corrector plates, it will be understood that it is equally applicable to the production of coated lenses, prisms, or other like optical elements.

Moreover, while the invention has been described in connection with the coating of optical elements of methyl methacrylate or a copolymer of methyl methacrylate, it is to be understood that the invention contemplates the use of any of the transparent, moldable, polymerizable methacrylates known to the art as the material to be coated.

It should be noted that in the preferred embodiment of the process of the invention described above while a common solvent, xylol, for the melamine-formaldehyde coating and for the methyl methacrylate cast or molded optical element is employed, it is employed in such relatively small quantity and in the presence of so great an amount of thinner, butanol, which is a nonsolvent for the cast or molded methacrylate element, that the optical properties of the methacrylate element are in no way effected, nor is the surface contour or smoothness in any way impaired by the use of the common solvent.

Since certain changes may be made in the above product without departing from the scope of the invention herein involved, it is intended that all matter contained in the above description shall be interpreted as illustrative and not in a limiting sense.

What is claimed is:

1. An optical element of a transparent, polymerized methacrylate resin coated with a hard, smooth, scratch-resistant, transparent, thermoset resin from the class consisting of melamine-formaldehyde, urea-formaldehyde, and phenol-formaldehyde resins, the said coating being of a substantially uniform thickness of the order of from 0.5 micron to 1.5 microns.

2. An optical element of a transparent, polymerized methacrylate resin having at least one curved surface, said surface being coated with a hard, smooth, scratch-resistant film of a thermoset, transparent, melamine-formaldehyde resin having a substantially uniform thickness not exceeding 1.5 microns.

3. A Schmidt corrector plate comprising polymerized methyl methacrylate coated with a hard, smooth, scratch-resistant layer of a thermoset melamine-formaldehyde resin, said layer having a substantially uniform thickness of the order of 0.5 micron to 1.5 microns.

DEXTER P. COOPER, Jr.

REFERENCES CITED

The following references are of record in the file of this patent:

UNITED STATES PATENTS

| Number | Name | Date |
|---|---|---|
| 1,964,039 | Dreyfus | June 26, 1934 |
| 1,980,483 | Hill | Nov. 13, 1934 |
| 2,259,395 | Sachtleben | Oct. 4, 1941 |
| 2,273,801 | Landis | Feb. 17, 1942 |
| 2,309,788 | Ramberg | Feb. 2, 1943 |
| 2,320,533 | Muskat et al. | June 1, 1943 |
| 2,331,716 | Nadeau et al. | Oct. 12, 1943 |
| 2,332,930 | Rinia | Oct. 26, 1943 |
| 2,332,958 | West | Oct. 26, 1943 |
| 2,339,433 | Staehle | Jan. 18, 1944 |
| 2,397,242 | Chubb et al. | Mar. 26, 1946 |
| 2,431,873 | Kennelly | Dec. 2, 1947 |
| 2,479,935 | Johnson | Aug. 23, 1949 |
| 2,481,809 | Barnes | Sept. 13, 1949 |

UNITED STATES PATENT OFFICE

CERTIFICATE OF CORRECTION

Patent No. 2,575,998 November 20, 1951

Dexter P. Cooper, Jr.

It is hereby certified that error appears in the printed specificatic of the above numbered patent requiring correction and that the said Letter Patent should read as corrected below.

Column 2, lines 13 and 14, for "advantage" read --disadvantage--; column 4, line 58, list of references cited, for "Oct. 4, 1941" read Oct. 14, 1941--.

Signed and sealed this 8th day of March, 1955.

(SEAL)

Attest:
E. J. MURRY
Attesting Officer

ROBERT C. WATSON
Commissioner of Patent